United States Patent
Lunghi et al.

(10) Patent No.: US 12,037,688 B2
(45) Date of Patent: Jul. 16, 2024

(54) POLYMER COMPOSITIONS SUITABLE FOR PRODUCING PLATED PRODUCTS

(71) Applicant: Basell Poliolefine Italia S.r.l., Milan (IT)

(72) Inventors: Luca Lunghi, Ferrara (IT); Maria Aranzazu Lujan Abarca, Reus (ES); Alberto Foguet Roca, Reus (ES)

(73) Assignee: Basell Poliolefine Italia S.r.l., Milan (IT)

( * ) Notice: Subject to any disclaimer, the term of this patent is extended or adjusted under 35 U.S.C. 154(b) by 398 days.

(21) Appl. No.: 17/602,369

(22) PCT Filed: Mar. 23, 2020

(86) PCT No.: PCT/EP2020/057913
§ 371 (c)(1),
(2) Date: Oct. 8, 2021

(87) PCT Pub. No.: WO2020/207772
PCT Pub. Date: Oct. 15, 2020

(65) Prior Publication Data
US 2022/0170162 A1    Jun. 2, 2022

(30) Foreign Application Priority Data
Apr. 12, 2019   (EP) ................................. 19168883

(51) Int. Cl.
*C23C 18/16*     (2006.01)
*C08L 23/12*     (2006.01)
(Continued)

(52) U.S. Cl.
CPC .......... *C23C 18/1641* (2013.01); *C08L 23/12* (2013.01); *C23C 18/1653* (2013.01); *C23C 18/31* (2013.01); *C25D 5/14* (2013.01)

(58) Field of Classification Search
None
See application file for complete search history.

(56) References Cited

U.S. PATENT DOCUMENTS 3,741,800 A * 6/1973 Baier et al. ............. C23C 18/30
525/240
3,862,265 A * 1/1975 Steinkamp .............. B29B 7/726
525/274
(Continued)

FOREIGN PATENT DOCUMENTS

CN       1558966 A   12/2004
CN     102458833 A    5/2012
(Continued)

OTHER PUBLICATIONS

Yamada—melting temp of isotactic PP—Macro—2003 (Year: 2003).*
International Search Report and Written Opinion Mailed Jun. 5, 2020 (Jun. 5, 2020) for Corresponding PCT/EP2020/057913.

*Primary Examiner* — John Vincent Lawler

(57) ABSTRACT

A method for the production of metal-plated articles, including the step of
depositing an electrically-conductive metallic layer on a surface of an article comprising a polymer composition comprising by weight:
a) 40-60% of a propylene homopolymer, or propylene copolymer containing up to 5% by weight of ethylene and/or another $C_4$-$C_{10}$ α-olefin, and having a melting temperature of 155° C. or higher and/or a fraction soluble in xylene at 25° C. of 10% by weight or less;
b) 10-20% of an ethylene-based elastoplastic copolymer, optionally, a copolymer of ethylene with $C_4$-$C_{10}$ α-olefin;
c) 2-6% of a styrene block copolymer;
d) optionally, up to 3% of a propylene homopolymer having a Melt Flow Rate (230° C./2.16 kg) of 500 g/10 min. or more;

(Continued)

e) 15-50% of a filler; and
f) optionally, up to 6% of a color pigment.

13 Claims, 1 Drawing Sheet

(51) Int. Cl.
*C23C 18/31* (2006.01)
*C25D 5/14* (2006.01)

(56) References Cited

U.S. PATENT DOCUMENTS

| | | | | |
|---|---|---|---|---|
| 4,002,595 A * | 1/1977 | Adelman | ................ | C08L 23/14 |
| | | | | 524/901 |
| 4,038,042 A * | 7/1977 | Adelman | ................ | C08L 23/12 |
| | | | | 264/129 |
| 4,278,510 A | 7/1981 | Chien et al. | | |
| 2002/0023845 A1 * | 2/2002 | Ding | ...................... | C08L 23/10 |
| | | | | 205/183 |
| 2008/0138609 A1 * | 6/2008 | Walker | ..................... | C09C 1/00 |
| | | | | 523/135 |
| 2009/0013906 A1 * | 1/2009 | Fischer | .................... | C09C 1/62 |
| | | | | 423/625 |
| 2009/0226727 A1 | 9/2009 | Tigaki | | |
| 2015/0099840 A1 | 4/2015 | Glogovsky et al. | | |

FOREIGN PATENT DOCUMENTS

| | | |
|---|---|---|
| CN | 107001783 A | 8/2017 |
| WO | 03025256 A1 | 3/2003 |
| WO | 2007063732 A1 | 6/2007 |
| WO | 2018215303 A1 | 11/2018 |

* cited by examiner

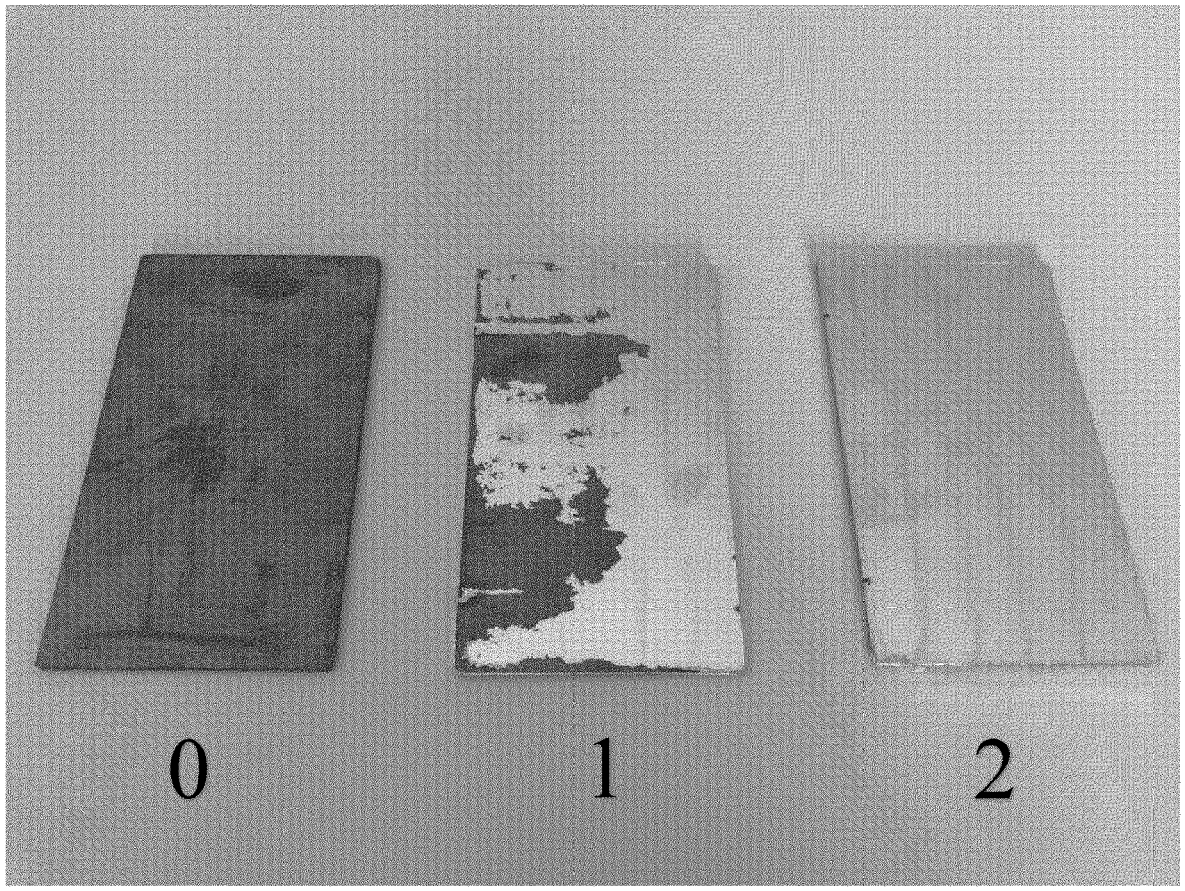

POLYMER COMPOSITIONS SUITABLE FOR PRODUCING PLATED PRODUCTS

This application is the U.S. National Phase of PCT International Application PCT/EP2020/057913, filed Mar. 23, 2020, claiming benefit of priority to European Patent Application No. 19168883.7, filed Apr. 12, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a method for the production of metal-plated products.

BACKGROUND OF THE INVENTION

In some instances, the process of depositing metal-plating on plastics provides aesthetic and physical enhancements to the plastic. In some instances, the affected physical properties include corrosion resistance, strength, and chemical resistance. In some instances, the metals used for plating are selected from the group consisting of copper, chromium, gold, silver and nickel. In some instances, the metal-plating process provides automotive parts and surfaces.

SUMMARY OF THE INVENTION

In a general embodiment, the present disclosure provides a method for the production of metal-plated products, including the step of:

depositing an electrically-conductive metallic layer on a surface of an article made from or containing a polymer composition made from or containing by weight
a) 40-60% of a propylene homopolymer, or propylene copolymer containing up to 5% by weight of ethylene and/or another $C_4$-$C_{10}$ α-olefin and having a melting temperature of 155° C. or higher and/or a fraction soluble in xylene at 25° C. of 10% by weight or less;
b) 10-20% of an ethylene based elastoplastic copolymer, optionally, a copolymer of ethylene with $C_4$-$C_{10}$ α-olefin;
c) 2-6% of a styrene block copolymer;
d) optionally, up to 3% of a propylene homopolymer having a Melt Flow Rate (230° C./2.16 kg) of 500 g/10 min. or more;
e) 15-50% of a filler; and
f) optionally, up to 6% of a color pigment.

In some embodiments, the present disclosure provides a metal-plated article.

While multiple embodiments are disclosed, still other embodiments will become apparent to those skilled in the art from the following detailed description. As will be apparent, certain embodiments, as disclosed herein, are capable of modifications in various aspects, without departing from the spirit and scope of the claims as presented herein. Accordingly, the drawings and detailed description are to be regarded as illustrative in nature and not restrictive.

DETAILED DESCRIPTION OF THE INVENTION

In a general embodiment, the present disclosure provides a method for the production of metal-plated products, including the step of:

depositing an electrically-conductive metallic layer on a surface of an article made from or containing a polymer composition made from or containing by weight
a) 40-60%, alternatively 45-50%, of a propylene homopolymer, or propylene copolymer containing up to 5% by weight of ethylene and/or another $C_4$-$C_{10}$ α-olefin and having a melting temperature of 155° C. or higher and/or a fraction soluble in xylene at 25° C. of 10% by weight or less;
b) 10-20%, alternatively 12-18%, of an ethylene based elastoplastic copolymer;
c) 2-6%, alternatively 3-4%, of a styrene block copolymer;
d) 0-3%, alternatively 1-2%, of a propylene homopolymer having a Melt Flow Rate (230° C./2.16 kg) of 500 g/10 min. or more;
e) 15-50%, alternatively 25-40%, of a filler; and
f) 0-6%, alternatively 1-4%, of a color pigment.

In some embodiments, the ethylene based elastoplastic copolymer is an impact modifier. In some embodiments, the impact modifier is a copolymer of ethylene with $C_4$-$C_{10}$ α-olefin.

In some embodiments, the color pigment is black.

In some embodiments, the filler is selected from the group consisting of talc (hydrated magnesium silicate), calcium carbonate (chalk), barium sulphate and mixtures thereof.

In some embodiments, the present disclosure provides a metal-plated article. In some embodiments, the metal-plated article is selected from the group consisting of interior automotive parts, exterior automotive parts, surface automotive parts, furniture parts, tooling parts, and household items.

In some embodiments, the metals used for plating are selected from the group consisting of copper, chromium, gold, silver, aluminum, nickel, and alloys. In some embodiments, the alloys are selected from the group consisting of steel and bronze.

In some embodiments, the polymer composition is further made from or containing an additive composition.

In some embodiments, the additive composition is present in an amount from about 0 to about 5 weight percent, relative to the total weight of the polyolefin-based composition. In some embodiments, the additive composition is present in an amount of 1, 2, 3, 4, or 5 weight percent, relative to the total weight of the polyolefin-based composition.

In some embodiments, component (a) is a propylene homopolymer and selected from the group consisting of commercial propylene homopolymers. In some embodiments, the commercial propylene homopolymers are selected from the group consisting of Adstif HA600U, Hostalen PP H1F500B, Moplen MP H1F400G, MP H1F500H, MP HP400H, MP HP400R, MP HP500N, MP HP500V, MP HP500W, and MP HP400G. These commercial propylene homopolymers are available from LyondellBasell.

In some embodiments, component (b) is a copolymer of ethylene with octene-1 containing at least 20 wt %, alternatively from 20 to 50 wt %, alternatively from 20 to 45% by weight, of units derived from octene-1 as comonomer (13C-NMR analysis).

In some embodiments, component (b) is selected from the group consisting of ethylene/octene-1 plastomers having a hardness (Shore A, ASTM D-2240) value equal to or lower than 90 points, alternatively equal to or lower than 85 points, alternatively equal to or lower than 80 points. In some embodiments, component (b) is an ethylene-based plastomer having density lower than 0.89, alternatively lower than 0.87 g/cm³ (measured according to ASTM D-792). In some embodiments, components (b) are selected from the group consisting of Engage™ 7467, 8100, 8150, and 8200, which are commercially available from DuPont Dow Elastomers.

In some embodiments, component (c) is selected from the group consisting of hydrogenated and non-hydrogenated styrene block copolymers. In some embodiments, the block copolymers have blocks derived from a diene and blocks derived from polystyrene or derivatives thereof. In some embodiments, the diene is polybutadiene or polyisoprene. In some embodiments, the block copolymers are of different types. In some embodiments, the different type is the AB, ABA, or A(B)$_4$ type. In some embodiments, the block copolymers are hydrogenated. In some embodiments, a mixture of two or more block copolymers is used. In some embodiments, the block copolymer has formula A-B-A', where A and A' are each a thermoplastic endblock which includes a styrenic moiety and where B is an elastomeric polybutadiene, poly (ethylenebutylene) or poly (ethylenepropylene) midblock.

In some embodiments, the A and A' endblocks of the block copolymer are identical and are selected from the group consisting of polystyrene and polystyrene homologs. In some embodiments, the A and A' endblocks are polystyrene or poly (alpha-methylstyrene). In some embodiments, the block copolymers are styrene-butadiene-styrene polymers, referred to as SBS. It is believed that the main chain of an SBS contains unsaturations which are oxidation sensitive; accordingly, in some embodiments, at least part of the aliphatic unsaturations of the copolymer is hydrogenated. In some embodiments, these block copolymers are elastomeric A-B-A' block copolymers having a saturated poly (ethylenebutylene) midblock B comprising units having formula

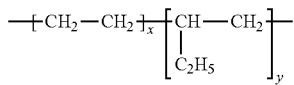

where x and y are positive integers, and polystyrene endblocks A and A' each represented by the formula.

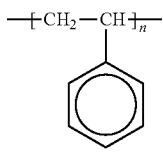

where n is a positive integer, and are referred to as SEBS block copolymers.

In some embodiments, the SBS and SEBS are commercially available under the trade designation Kraton™ D, such as Kraton™ D 1101 and 1107, and Kraton™ G, such as Kraton™ G 1650, Kraton™ G 1652 and Kraton™ GX 1657, sold by Kraton Polymers. In some embodiments, the block copolymers are as described in U.S. Pat. Nos. 4,323, 534 and 4,355,425.

In some embodiments, the styrene block copolymers styrene-ethylenepropylene-styrene polymers, referred to as SEPS. In some embodiments, these block copolymers are commercially available under Septon™ from Kuraray America Inc.

In some embodiments, component (d) are polypropylene homopolymers having extremely high melt flow rate and very narrow molecular weight distribution. In some embodiments, "extremely high melt flow rate" refers to a melt flow rate higher than 1000 g/10 min (230° C./2.16 kg). In some embodiments, "very narrow molecular weight distribution" refers to Mw/Mn lower than 4. In some embodiments, the component (d) polypropylene homopolymers are available commercially as Metocene MF650Y from LyondellBasell.

In some embodiments, talc is used as a filler. In some embodiments, talc is used as component (e). In some embodiments, the talc is in particle form having an average particle size (Sedigraph ISO 13317-3) ranging from (D50) 0.1 to 20 micrometers (m). In some embodiments, the talc has a lamellarity index equal to or higher than 2.8. The lamellarity index characterizes the shape of the particle or the particle's flatness (large dimension/thickness). In some embodiments, the lamellarity index is measured by the difference between, on the one hand, the value of the mean dimension of the particles of the powder obtained by a particle size measurement by Malvern laser diffraction using a wet method (standard AFNOR NFX11-666) and on the other hand, the value of the mean diameter D50 obtained by a measurement by sedimentation using a "Sedigraph" (standard AFNOR XI 1-683), this difference being related to the mean diameter D50. "G.BAUDET and J. P. RONA, Ind. Min. Mines et Carr. Les techn. June, July 1990, pp 55-61" shows that this index is correlated to the mean ratio of the largest dimension of the particle to its smallest dimension. As used herein, the term "high lamellarity" rerefers to a powder of which the lamellarity index is greater than 2.8, alternatively equal to or greater than 4.

In some embodiments, additives are selected from the group consisting of colorants, odorants, deodorants, plasticizers, impact modifiers, nucleating agents, lubricants, surfactants, wetting agents, flame retardants, ultraviolet light stabilizers, antioxidants, biocides, metal deactivating agents, thickening agents, heat stabilizers, defoaming agents, coupling agents, polymer alloy compatibilizing agents, blowing agents, emulsifiers, crosslinking agents, waxes, particulates, and flow promoters.

In some embodiments, the polymer compositions are obtained by melting and mixing the components. In some embodiments, the mixing is effected in a mixing apparatus at temperatures between 1800 and 310° C., alternatively between 1900 and 280° C., alternatively between 200° and 250° C.

In some embodiments, the mixing apparatus is selected from the group consisting of extruders and kneaders. In some embodiments, the mixing apparatus is a twin-screw extruder. In some embodiments, the components are premixed at room temperature in a mixing apparatus.

In some embodiments, components (a) and (d) and modifiers (b) and (c) are melted initially. In some embodiments, component (e) is mixed subsequently with the melt. It is believed that the mixing sequence reduces abrasion in the mixing apparatus and fiber breakage.

In some embodiments, a masterbatch is used in premixed form.

In some embodiments, the polymer compositions are further made from or containing additives. In some embodiments, the additives are selected from the group consisting of stabilizing agents (against heat, light, U.V.), nucleating agents, plasticizers, antiacids, antistatic, slip agents, and water repellent agents. In some embodiments, slip agents are selected from the group consisting of stearates and polar waxes.

In some embodiments, the metal-plating is carried out according to the procedure described in U.S. Pat. No. 4,552,626 and/or by the following process.

To ensure adhesion of the metal, the surface of the article to be plated is cleaned and made hydrophilic, before treatment to deglaze the polymer composition and remove the filler from the surface. In some embodiments, mold release agents, dirt and fingerprints are removed from the surface. In some embodiments, alkaline cleaning solution with surfactants, chelators, and dispersants are used. In some embodiments, the cleaning solution is an alkaline soak cleaner, commercially available from Enthone Inc. under trade name Enplate® PZ-454. In some embodiments, the articles are cleaned by immersing the articles for about 3 to 10 minutes in a bath of this cleaning solution. In some embodiments, the immersion takes place at an operating temperature of about 43° to 60° C. In some embodiments and after cleaning, the articles are rinsed in fresh water, such as by immersion, to remove the cleaning solution.

In some embodiments, the mineral filler is removed from the polymer composition surface by contact with an organic or mineral acid, which will dissolve and remove the filler. In some embodiments, the acids have a normality of less than about 4.0, alternatively about 1.0 to 3.0. In some embodiments, the articles are immersed in an acid bath at an operating temperature of about 15° to 43° C. In some embodiments, the acid is ammonium bifluoride, which is commercially available from Atotech Italia S.r.l. under trade name Adhemax PA Conditioner.

In some embodiments and to obtain improved adhesion of the electroplated metal, the treated polymer surface is cleaned and dried before electroless plating. In some embodiments, the treated surface is cleaned by washing the surface in tap water. In some embodiments, the surface is washed several times in tap water. In some embodiments, the treated surface is then washed in distilled or deionized water. In some embodiments, the polymer surface is cleaned by immersion in baths of tap and deionized water for at least about 10 to 60 seconds at an operating temperature in the range of about 15° to 50° C.

In some embodiments, the treated polymer surface retains moisture, which is removed by drying before applying a catalyst for electroless painting, thereby providing adhesion of the electroplated metal to the surface of the resin. In some embodiments, the cleaned and treated polymer surface is dried in a forced air oven with filtered air heated to a temperature of about 50° to 90° F. In some embodiments, the resin surface is subjected to the forced hot air in the oven for about 15 to 30 minutes.

To enable metallic electroplating, an electrically conductive metallic layer is deposited on the treated resin surface of the article. In some embodiments, the resin surface of the article was cleaned and dried. In some embodiments, the electrically conductive metallic layer is deposited by electroless plating techniques. In some embodiments, the surface is electroless plated by tin-palladium transfer techniques wherein the surface is sensitized, activated or catalyzed, and then contacted with a metallic salt solution to deposit elemental metal by chemical reduction.

The electroless plated resin surface is electroplated to provide a metallic finish. In some embodiments, the surface is electroplated with copper followed by nickel or chromium or with nickel followed by chromium. In some embodiments, the thickness of the electroplated coating is in the range of about 0.0025 to 0.25 mm., alternatively about 0.0075 to 0.15 mm., alternatively about 0.015 to 0.05 mm. In some embodiments and to provide corrosion resistance and a truer color of a chromium layer, a nickel layer is deposited on the copper. To provide abrasion resistance and a brilliant and decorative finish, a layer of layers of chromium are deposited. In some embodiments and to prevent contamination, the resin surface is washed or rinsed between each bath such as by immersion in a fresh water bath at room temperature. In some embodiments, the water bath is agitated. At the end of the cycles, the metallic plated articles are then dried in a forced air oven with filtered air heated to a temperature of about 50° to 90° C. for about 15 to 30 minutes.

As used in this specification and the claims, the singular forms "a," "an," and "the" include plural referents, unless the context dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that, which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a means for identifying discrete activities or ingredients and the recited lettering can be arranged in any sequence, unless expressly indicated.

For the purpose of the present description and of the claims which follow, except where otherwise indicated, numbers expressing amounts, quantities, percentages, and so forth, are to be understood as being modified by the term "about". Also, ranges include any combination of the maximum and minimum points disclosed and include any intermediate ranges therein, which may or may not be specifically enumerated herein.

Definitions

In the present description, the term "additives composition" refers to a composition made from or containing at least one additive.

In the present description, the term "homopolymer", as used herein, is consistent with its ordinary meaning. To the extent that a homopolymer may contain one or more monomeric units, the incorporation of any additional monomeric units has no measurable effect on the polymer's primary, secondary, or tertiary structure or no effect on the polymer's physical or chemical properties. In other words, there is no measurable difference between a polymer made from or containing 100 weight percent of a first monomeric unit, and a copolymer that includes more than one monomeric unit.

In the present description, the term "polymer" means a macromolecular compound prepared by polymerizing monomers of the same or different type. The term "polymer" includes homopolymers, copolymers, terpolymers, interpolymers, and so on.

In the present description, the term "polymer composition" refers to a composition made from or containing at least one polymer.

In the present description, the term $C_4$-$C_{10}$ α-olefin refers to an alpha-olefin of formula $CH_2$=CH—R, wherein R is a linear or branched alkyl containing from 2 to 8 carbon atoms.

In the present description, the term "room temperature" refers to a temperature around +23 degrees Celsius.

For purposes of any patent application filed in jurisdictions (such as the United States) in which the term "about" is recognized as adding flexibility without limitation to the disclosed ranges, it is understood that numbers disclosed herein are approximates unless otherwise noted. According, as a non-limiting example, where the range 40-60% is disclosed, it will be understood that for purposes of patent prosecution and enforcement in the United States, such a range will be read as "about 40-60%.

The wordings "up to", "at most", "or more" or "or less" should be interpreted as having a lower limit which includes the presence of the element. Accordingly, as a non-limiting example, where the range "up to 5%" is disclosed, it will be understood that for purposes of patent prosecution and enforcement in the United States, such a range will be read as between about, but greater than, 0 to about 5%.

ISO 1133 is entitled "Test Method for Melt Flow Rates of Thermoplastics by Extrusion Plastometer." The term "ISO 1133," as used herein, refers to the standard test method for determining Melt Flow Rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published on March 2012, the contents of which are incorporated herein by reference in its entirety.

Throughout the present description and claims, the standard Melt Flow Rate values of polypropylene polymers are measured according to ISO 1133, using a piston load of 2.16 kg and at a temperature of 230 degrees Celsius. (Melt Flow Rate: Determined according to the method ISO 1133 (230° C., 2.16 kg)).

Xylene cold soluble content (XS): Xylene soluble fraction is determined according to the following method. 2.5 g of polymer and 250 cm$^3$ of o-xylene are introduced into a glass flask equipped with a refrigerator and a magnetic stirrer. The temperature is raised in 30 minutes from room temperature up to the boiling point of the solvent (135° C.). The resulting clear solution is then kept under reflux and stirring for further 30 minutes. The closed flask is then kept in a thermostatic water bath at 25° C. for 30 minutes as well, thereby crystallizing the insoluble (XI) part of the sample. The resulting solid is filtered on quick filtering paper. 100 cm$^3$ of the filtered liquid are poured into a pre-weighed aluminum container, which is heated on a heating plate under nitrogen flow, thereby removing the solvent by evaporation. The container is then kept in an oven at 80° C. under vacuum to dryness and then weighed after constant weight is obtained. The percent by weight of polymer soluble and insoluble in xylene at 25° C. are then calculated.

The Elastic Flexural Modulus is measured according to ISO 178 while the Tensile Stress at Break is measured according to ISO 527.

DESCRIPTION OF THE FIGURE

The FIGURE shows a ranking given to the chroming quality by assigning a score (0=no chroming, 1=acceptable; 2=good) on the basis of visual evaluation. The plaque on the left was assigned score of 0, the plaque in the middle was assigned a score of 1, and the plaque on the right was assigned a score of 2.

EXAMPLES

The following examples are included to demonstrate embodiments. It should be appreciated by those of skill in the art that the techniques disclosed in the examples which follow represent techniques discovered to function well, and thus can be considered to constitute exemplary modes of practice. However, those of skill in the art should, in light of the present disclosure, appreciate that many changes can be made in the specific embodiments which are disclosed and still obtain a like or similar result without departing from the spirit and scope of this disclosure.

For the comparative examples and the examples of an embodiment, various compounds were formulated to prepare test specimen.

Example 1—Preparation of Polymer Composition 1

Polymer Composition 1 was prepared by melting and mixing the following components: 35.8% by weight of AdstifHA600U as component (a), 14.8% by weight of Engage™ 7467 as component (b), 3.3% by weight of Kraton™ D 1101 as component (c), 1.6% by weight of Metocene™ MF650Y as component (d), 40% by weight of talc (the commercial product sold under the trademark JETFINE® 3CA) as component (e), 1% by weight of black pigment (the commercial product sold under the name BK MB LD-32232) as component (f) and 3.5% by weight of master additives. The mixing was effected in a twin-screw extruder at a temperature of 280° C. Components (a) and (d) and modifier components (b) and (c) were initially molten, and subsequently component (e) was mixed with the melt.

Example 2—Preparation of Polymer Composition 2

Polymer Composition 2 was prepared as described in Example 1, with the difference that $CaCO_3$ was used as component (e) instead of talc.

Example 3—Preparation of Polymer Composition 3

Polymer Composition 3 was prepared as described in Example 1, with the difference that no black pigment was used and the polymer components were re-balanced to maintain the same relative proportions in weight as defined in Example 1.

Example 4—Preparation of Polymer Composition 4

Polymer Composition 4 was prepared as described in Example 1, with the difference that a mixture of 40% by weight of $CaCO_3$ and 15% by weight of mica was used as component (e) instead of 40% by weight of talc and the polymer components were re-balanced to maintain the same relative proportions in weight as defined in Example 1.

Example 5—Preparation of Polymer Composition 5

Polymer Composition 5 was prepared as described in Example 1, with the difference that 50% by weight of talc was used as component (e) instead of 40% by weight and the polymer components were re-balanced to maintain the same relative proportions in weight as defined in Example 1.

Example 6—Preparation of Polymer Composition 6

Polymer Composition 6 was prepared as described in Example 1, with the difference that 50% by weight of $CaCO_3$ was used as component (e) instead of 40% by weight of talc and the polymer components were re-balanced to maintain the same relative proportions in weight as defined in Example 1

Example 7—Preparation of Polymer Composition 7

Polymer Composition 7 was prepared as described in Example 1, with the difference that talc HAR 3G 84L (supplied by IMYERS Specialties) was used as component (e).

Comparative Example 1

For comparative purposes, the following Polymer Composition A was prepared. Polymer Composition A was prepared by melting and mixing the following components: 47% by weight of Hifax CA 60 A (supplied by Lyondell-Basell), 50% by weight of talc Ultra C, 1% by weight of black pigment and 2% of master additives.

Comparative Example 2

For comparative purposes, the commercial polymer Metocene™ MF650Y was used in the chromium-plating tests.

Example 8—Chromium-Plating Process for Preparing Chromium-Plated Plaques

Cleaning the Articles

Rectangular plaques made of the polymer compositions prepared according to the previous Examples 1-7 and Comparative Examples 1 and 2 were cleaned with an alkaline soak cleaner, commercially available from Enthone Inc. under trade name Enplate® PZ-454. The plaques were cleaned by immersing the plaques for about 5 minutes in a bath of this cleaning solution at an operating temperature of 50° C. After cleaning, the articles were rinsed in fresh water, by immersion, to remove the cleaning solution.

Removal of Filler from the Resin Surface

The mineral filler was removed from the plaques surfaces by immersing the plaques in a bath of ammonium bifluoride, commercially available from Atotech Italia S.r.l. under trade name Adhemax® PA Conditioner at an operating temperature of 30° C.

Cleaning the Treated Resin Surface

The plaques were then further cleaned by washing the plaques in tap water several times and then, in deionized water for about 40 seconds at an operating temperature of about 37° C.

Drying the Treated Resin Surface

The plaques surfaces were then dried in a forced air oven with filtered air heated to a temperature of about 70° C. for about 20 minutes.

Electroless Plating of the Resin Surface

The plaques surfaces were electroless plated by tin-palladium transfer techniques, that is, contacted with $CrCl_3$ aqueous solution to deposit elemental chromium by chemical reduction.

Electroplating

The electroless plated plaques surfaces were electroplated to provide a metallic finish. The surfaces were electroplated with copper followed by nickel followed by chromium. The thickness of the electroplated coating was about 0.66 mm. At the end of the plating cycles, the chromium plated articles were dried in a forced air oven with filtered air heated to a temperature of about 70° C. for about 20 minutes.

Example 9—Quality Evaluation of the Chromium-Plated Articles

The results of the chromium-plating process carried out as described in previous Example 8 on rectangular plaques made of the polymer compositions prepared according to the previous Examples 1-7 and Comparative Examples 1 and 2 are reported in the following Table 1. Plaques have been evaluated considering the adhesion of the chromed coating, scratch resistance, and delamination. An overall ranking has been quantified, assigning a score (0=no chroming, 1=acceptable; 2=good) on the basis of visual evaluation. An example of the assignment of such "chroming scores" is provided in the FIGURE.

TABLE 1

| | Polymer Composition (Examples) | | | | | | | | |
|---|---|---|---|---|---|---|---|---|---|
| | 1 | 2 | 3 | 4 | 5 | 6 | Comp. 1 | 7 | Comp. 2 |
| Chroming Score * | 2 | 2 | 1 | 2 | 2 | 2 | 0 | 1 | 0 |

* 0 = No chroming, 1 = Acceptable, 2 = Good

The results reported in Table 1 show that some specific polymer compositions achieve chroming score of 2.

Example 10—Mechanical Properties Evaluation of the Chromium-Plated Articles

Elastic flexural modulus (ISO 178) and tensile stress at break (ISO 527) were measured for the rectangular plaques made of the polymer compositions prepared according to the previous Examples 1, 2, 4, 5 and 6 before and after chroming process according to Example 8. The results of such tests are reported in Table 2 and are expressed in terms of percent improvement of the mechanical property after chroming.

TABLE 2

| | | Polymer Composition (Examples) | | | | |
|---|---|---|---|---|---|---|
| | | 1 | 2 | 4 | 5 | 6 |
| Elastic Flexural | Before (MPa) | 3700 | 1530 | 1670 | 3610 | 1600 |
| Modulus - | After (MPa) | 9940 | 8670 | 8950 | 13540 | 7940 |
| ISO 178 | Improvement (%) | 168 | 466 | 436 | 275 | 396 |
| Tensile Stress | Before (MPa) | 20.0 | 12.6 | 10.0 | 18.3 | 10.0 |
| at break - | After (MPa) | 22.6 | 18.8 | 14.1 | 18.3 | 12.4 |
| ISO 527 | Improvement (%) | 13 | 49 | 41 | 0 | 24 |

What is claimed is:
1. A method for the production of metal-plated articles, comprising the step of
  depositing an electrically-conductive metallic layer on a surface of an article comprising a polymer composition comprising by weight:
  a) 40-60% of a propylene homopolymer, or propylene copolymer containing up to 5% by weight of ethylene and/or another $C_4$-$C_{10}$ α-olefin, and having a melting temperature of 155° C. or higher and/or a fraction soluble in xylene at 25° ° C. of 10% by weight or less;

b) 10-20% of an ethylene-based elastoplastic copolymer, optionally, a copolymer of ethylene with $C_4$-$C_{10}$ α-olefin, wherein the ethylene-based elastoplastic copolymer has a density lower than 0.89 g/cm$^3$;

c) 2-6% of a styrene block copolymer;

d) optionally, up to 3% of a propylene homopolymer having a Melt Flow Rate (230° C./2.16 kg) of 500 g/10 min. or more;

e) 15-50% of a filler; and f) optionally, up to 6% of a color pigment.

2. The method according to claim 1, wherein the component (a) is present at concentrations of 45-50% by weight.

3. The method according to claim 1, wherein the component (b) is present at concentrations of 12-18% by weight.

4. The method according to claim 1, wherein the component (c) is present at concentrations of 3-4% by weight.

5. The method according to claim 1, wherein the component (d) is present at concentrations of 1-2% by weight.

6. The method according to claim 1, wherein the component (e) is present at concentrations of 25-40% by weight.

7. The method according to claim 1, wherein the component (f) is present at concentrations of 1-4% by weight.

8. The method according to claim 1, wherein the metal used for plating is selected from the group consisting of copper, chromium, gold, silver, aluminum, nickel and metal alloys.

9. The method according to claim 1, wherein the color pigment is black.

10. A metal-plated article prepared by the method according to claim 1.

11. The metal-plated article according to claim 10, wherein the article is selected from the group consisting of interior automotive parts, exterior automotive parts, and surface automotive parts.

12. The metal-plated article according to claim 10, wherein the article is a furniture part.

13. The metal-plated article according to claim 10, wherein in the article is selected from the group consisting of tooling parts and household items.

* * * * *